(12) United States Patent
Fujimura et al.

(10) Patent No.: US 9,061,441 B2
(45) Date of Patent: Jun. 23, 2015

(54) METHOD FOR PRODUCING VINYL ALCOHOL RESIN

(75) Inventors: Keisuke Fujimura, Osaka (JP); Osamu Hommura, Osaka (JP); Yasufumi Beniya, Osaka (JP); Satoshi Matsunuma, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 262 days.

(21) Appl. No.: 13/092,329

(22) Filed: Apr. 22, 2011

(65) Prior Publication Data

US 2011/0237738 A1    Sep. 29, 2011

Related U.S. Application Data

(63) Continuation of application No. PCT/JP2009/068378, filed on Oct. 27, 2009.

(30) Foreign Application Priority Data

Oct. 27, 2008  (JP) .................. 2008-275755
Oct. 26, 2009  (JP) .................. 2009-245933

(51) Int. Cl.
| C08L 29/04 | (2006.01) |
| B29B 7/42 | (2006.01) |
| B29B 7/84 | (2006.01) |
| C08F 6/00 | (2006.01) |
| B29C 47/36 | (2006.01) |
| B29C 47/38 | (2006.01) |
| B29C 47/60 | (2006.01) |

(52) U.S. Cl.
CPC . B29B 7/42 (2013.01); B29B 7/845 (2013.01); C08F 6/008 (2013.01); B29C 47/366 (2013.01); B29C 47/385 (2013.01); B29C 47/6056 (2013.01); B29C 47/6087 (2013.01)

(58) Field of Classification Search
CPC ........... B29B 7/42; B29B 7/845; C08F 6/008; C08F 29/04
USPC ............................................. 524/557; 525/62
See application file for complete search history.

(56) References Cited

U.S. PATENT DOCUMENTS

| 5,205,973 | A | * | 4/1993 | Kafka .......................... 264/101 |
| 6,165,399 | A | | 12/2000 | Güntherberg |
| 6,838,029 | B2 | | 1/2005 | Kawahara |
| 2002/0100997 | A1 | | 8/2002 | Kawahara |
| 2002/0135098 | A1 | * | 9/2002 | Kawai et al. .................. 264/143 |
| 2003/0067089 | A1 | | 4/2003 | Wang |
| 2004/0082690 | A1 | | 4/2004 | Kawahara |
| 2006/0108703 | A1 | | 5/2006 | Uchiumi |
| 2007/0122731 | A1 | * | 5/2007 | Yoshida et al. ............ 430/109.3 |

FOREIGN PATENT DOCUMENTS

| EP | 1225185 | 7/2002 |
| JP | 11-268098 | 10/1999 |
| JP | 2002-284811 | 10/2002 |
| JP | 2002-284886 | 10/2002 |
| JP | 2004-066721 | 3/2004 |
| JP | 2005-501759 | 1/2005 |
| JP | 2005-329718 | 12/2005 |
| WO | 98/13412 | 4/1998 |
| WO | 2004/009313 | 1/2004 |

OTHER PUBLICATIONS

Supplementary European Search Report issued for counterpart European Patent Application No. 09823568.2 dated Dec. 1, 2011.
International Search Report issued in PCT/JP2009/068378 dated Nov. 25, 2009.
International Preliminary Report on Patentability issued for counterpart International Patent Application No. PCT/JP2009/068378 dated Jun. 16, 2011.

* cited by examiner

Primary Examiner — David W Wu
Assistant Examiner — Marie Reddick
(74) Attorney, Agent, or Firm — Kratz, Quintos & Hanson, LLP

(57) ABSTRACT

A method of producing a vinyl alcohol resin having a water content of not higher than 10 wt % by performing a multistage dewatering process by means of a kneading machine. The method permits efficient dewatering of a highly hydrous vinyl alcohol resin to ensure easy production of a lower water content vinyl alcohol resin having a water content of not higher than 10 wt %, thereby reducing production costs.

8 Claims, No Drawings

METHOD FOR PRODUCING VINYL ALCOHOL RESIN

RELATED APPLICATION

This application is a continuation of International Application No. PCT/JP2009/068378, filed on Oct. 27, 2009, which claims priority to Japanese Patent Application No. 2008-275755, filed on Oct. 27, 2008, and Japanese Patent Application No. 2009-245933 filed on Oct. 26, 2009, the entire contents of which are hereby incorporated by reference.

TECHNICAL FIELD

The present invention relates to a method of producing a lower water content vinyl alcohol resin by kneading and dewatering a,hydrous vinyl alcohol resin such as a hydrous polyvinyl alcohol resin (hereinafter often abbreviated as "PVA") or a hydrous ethylene-vinyl alcohol copolymer (hereinafter often abbreviated as "EVOH") by means of a kneading machine such as an extruder.

BACKGROUND OF THE INVENTION

EVOHs are excellent in transparency, and have excellent gas barrier properties (for example, oxygen barrier properties), aroma retaining properties, solvent resistance, oil resistance, mechanical strength and the like, and are typically formed into films, sheets, bottles and the like, which are widely used for various types of packaging materials such as food packaging materials, medical drug packaging materials, industrial chemical packaging materials and agricultural chemical packaging materials.

Such an EVOH can be produced by preparing an ethylene-vinyl ester copolymer through copolymerization of ethylene and a fatty acid vinyl ester such as vinyl acetate, and saponifying the ethylene-vinyl ester copolymer in an alcohol solvent such as methanol in the presence of an alkali catalyst under higher-temperature higher-pressure conditions.

It is possible to convert the EVOH alcohol solution prepared under the higher-temperature higher-pressure conditions through the saponification into an EVOH water/alcohol mixture solution stable at an ordinary pressure by replacing a part of the alcohol of the solution with water, then extrude the EVOH water/alcohol mixture solution in a coagulation bath mainly containing water at a lower temperature for solidification in the form of strands, cut the strands for pelletization, and dry the resulting pellets to provide a product.

In this EVOH preparation process, however, the alcohol is liable to run into the coagulation bath. The alcohol is evaporated in air, thereby impairing a working environment.

To solve this problem, there has been proposed a method in which most of the alcohol in the EVOH alcohol solution is replaced with water, and the resulting hydrous EVOH is supplied into an extruder and kneaded while being dewatered (see, for example, PLT1).

On the other hand, PVAs have excellent gas barrier properties (oxygen barrier properties), can be formed into films and sheets, and are widely used for various types of materials.

Such a PVA can be produced by preparing a polyvinyl ester through polymerization of a fatty acid vinyl ester and saponifying the polyvinyl ester in the presence of an alkali catalyst solvent such as methanol. A product of the PVA is provided by extruding the resulting PVA alcohol solution in a coagulation bath mainly containing water at a lower temperature for solidification in the form of strands, cutting the strands for pelletization, and drying the resulting pellets. Therefore, this PVA production process suffers from the same problem.

CITATION LIST

Patent Literature

PLT1: JP-A-2002-284811(U.S. Pat. No. 6,838,029)

The inventors of the present invention reviewed the prior art disclosed in PLT1 in detail, and found that the hydrous vinyl alcohol resin obtained by replacing the alcohol of the alcohol solution of the vinyl alcohol resin with water contains a great amount of water and, therefore, it is difficult to dewater the hydrous vinyl alcohol resin while kneading the hydrous vinyl alcohol resin in the extruder.

SUMMARY OF THE INVENTION

The present invention provides a vinyl alcohol resin production method which includes the step of kneading and dewatering a hydrous vinyl alcohol resin in a kneading machine such as an extruder, and improves the processing efficiency in the kneading machine such as the extruder to ensure easy production of a lower water content vinyl alcohol resin.

As a result of intensive studies in view of the foregoing, the inventors of the present invention found that the present invention is achieved by performing a multistage dewatering process for dewatering the hydrous vinyl alcohol resin in the kneading machine while kneading the hydrous vinyl alcohol resin in the kneading machine in the vinyl alcohol resin production method, and attained the present invention.

A feature of the present invention is that the step of kneading and dewatering the hydrous vinyl alcohol resin in the kneading machine for the production of the lower water content vinyl alcohol resin is performed in a plurality of kneading areas rather than in a single-stage kneading machine, whereby the water content is moderately reduced in a former-stage kneading area and finally reduced to not higher than 10 wt % in a latter-stage or final-stage kneading area.

DETAILED DESCRIPTION OF THE INVENTION

The inventive vinyl alcohol resin production method permits efficient dewatering of the highly hydrous vinyl alcohol resin to ensure easy production of the lower water content vinyl alcohol resin, thereby reducing the production costs. Therefore, the inventive method is useful in industry.

The following description pertains to one exemplary embodiment (typical embodiment) of the present invention, and the present invention is not limited to this embodiment.

One exemplary embodiment of the present invention will hereinafter be described in detail.

A vinyl alcohol resin to be used in the present invention is a hydrophilic resin typically containing a hydroxyl group in a proportion of 20 to 100 mol %, preferably 50 to 100 mol %. More specifically, a PVA or an EVOH is used as the vinyl alcohol resin. Particularly, a vinyl alcohol resin having a melting point of 120° C. to 200° C. is preferably used.

Description of EVOH

The EVOH to be used in the present invention will be first described.

The EVOH to be used in the present invention is typically prepared by saponifying an ethylene-vinyl ester copolymer obtained by copolymerizing ethylene and a fatty acid vinyl ester such as vinyl acetate. The EVOH contains an ethylene structural unit and a vinyl alcohol structural unit, and further contains a small amount of a vinyl ester structural unit depending on the degree of the saponification.

The EVOH to be used in the present invention typically has an ethylene content of 2 to 80 mol %.

Where an ordinary melt-formable EVOH is to be produced, the ethylene content is typically 20 to 60 mol %, preferably 20 to 55 mol %, particularly preferably 25 to 50 mol %. If the ethylene content is too low, the thermolysis temperature and the melting point of the resulting EVOH are too close to each other, making it difficult to properly perform a melt-forming process. If the ethylene content is too high, on the other hand, the gas barrier property is deteriorated.

Where a special EVOH to be used for a water-soluble resin is to be produced, the ethylene content of the EVOH is typically not lower than 0.1 mol % and lower than 20 mol %, preferably not lower than 2 mol % and lower than 20 mol %, more preferably 3 to 10 mol %. If the ethylene content is too high, the water solubility tends to be reduced. The EVOH having a lower ethylene content is useful to provide an aqueous solution, which is used as a coating agent for formation of a gas barrier coating film.

A vinyl acetate component in the EVOH to be used in the present invention typically has a saponification degree of not lower than 80 mol %. Where the gas barrier property is required, the saponification degree is preferably higher, typically not lower than 95 mol %, preferably not lower than 98 mol %. If the saponification degree is too low, the gas barrier property and the moisture resistance tend to be reduced.

The polymerization degree of the EVOH is properly selected depending on the use purpose of the EVOH. Where the EVOH is used as a material for the melt-forming, the EVOH typically has a melt flow rate (MFR) of 0.5 to 100 g/10 minutes, preferably 1 to 50 g/10 minutes, particularly preferably 2 to 35 g/10 minutes (at 210° C. with a load of 2160 g). If the MFR is too low, it is difficult to extrude the EVOH in the melt forming process because the torque in an extruder is increased. If the MFR is too high, on the other hand, it is difficult to increase the thickness accuracy of a sheet or a film to be produced by the melt forming.

The EVOH is typically prepared by saponifying the ethylene-vinyl ester copolymer obtained by copolymerizing the fatty acid vinyl ester compound and ethylene. The ethylene-vinyl ester copolymer is prepared by a known polymerization process such as solution polymerization, suspension polymerization, emulsion polymerization or bulk polymerization. Particularly, the solution polymerization is preferably used.

Examples of the fatty acid vinyl ester compound include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate, among which vinyl acetate is economically preferred.

Ethylene is introduced into the copolymer through ordinary ethylene pressure polymerization, and the amount of ethylene to be introduced is controlled by the pressure of ethylene. The pressure of ethylene is typically selected from the range of 25 to 80 kg/cm$^2$, depending on a desired ethylene content.

A copolymerizable ethylenically unsaturated monomer may be used in addition to ethylene and the fatty acid vinyl ester compound for the copolymerization, as long as the properties required for the EVOH are not impaired. Examples of the monomer include: olefins such as propylene, 1-butene and isobutene; hydroxyl-containing α-olefins such as 2-propen-1-ol, 3-buten-1-ol, 4-penten-1-ol, 5-hexen-1-ol, 3,4-dihydroxy-1-butene and 5-hexene-1,2-diol, and acylation products and esterification products thereof (e.g., 3,4-diacyloxy-1-butene, particularly 3,4-diacetoxy-1-butene); unsaturated acids such as acrylic acid, methacrylic acid, crotonic acid, (anhydrous) phthalic acid, (anhydrous) maleic acid and (anhydrous) itaconic acid, and salts thereof and $C_{1-18}$ monoalkyl or dialkyl esters thereof; acrylamides such as acrylamide, $C_{1-18}$ N-alkylacrylamides, N,N-dimethylacrylamide, 2-acrylamidepropanesulfonic acid and salts thereof, and acrylamidepropyldimethylamine, acid salts thereof and quaternary salts thereof; methacrylamides such as methacrylamide, $C_{1-18}$ N-alkylmethacrylamides, N, N-dimethylmethacrylamide, 2-methacrylamidepropanesulfonic acid and salts thereof, and methacrylamidepropyldimethylamine, acid salts thereof and quaternary salts thereof; N-vinylamides such as N-vinylpyrrolidone, N-vinylformamide and N-vinylacetamide; vinyl cyanates such as acrylonitrile and methacrylonitrile; vinyl ethers such as $C_{1-18}$ alkyl vinyl ethers, hydroxyalkyl vinyl ethers and alkoxyalkyl vinyl ethers; halogenated vinyls such as vinyl chloride, vinylidene chloride, vinyl fluoride, vinylidene fluoride and vinyl bromide; vinylsilanes such as trimethoxyvinylsilane; and allyl chloride, trimethyl-(3-acrylamide-3-dimethylpropyl)ammonium chloride, acrylamide-2-methylpropanesulfonic acid, vinylethylene carbonate and glycerol monoallyl ether.

Particularly, an EVOH prepared through copolymerization of any of the hydroxyl-containing α-olefins is preferred because of excellent melt-formability, and an EVOH having 1,2-diol at its side chain is particularly preferred.

The EVOH having 1,2-diol at its side chain contains a 1,2-diol structural unit at its side chain. More specifically, the 1,2-diol structural unit is the following structural unit (1):

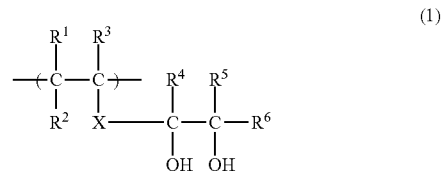

wherein $R^1$, $R^2$ and $R^3$ are independently a hydrogen atom or an organic group, X is a single bond or a bonding chain, and $R^4$, $R^5$ and $R^6$ are independently a hydrogen atom or an organic group.

The organic group in the 1,2-diol structural unit represented by the above general formula (1) is not particularly limited, but examples thereof include saturated hydrocarbon groups such as a methyl group, an ethyl group, a n-propyl group, an isopropyl group, a n-butyl group, an isobutyl group and a tert-butyl group, aromatic hydrocarbon groups such as a phenyl group and a benzyl group, halogen groups, a hydroxyl group, acyloxy groups, alkoxycarbonyl groups, a carboxyl group and a sulfonic group.

In the above general formula (1), $R^1$ to $R^3$ are each a saturated hydrocarbon group typically having a carbon number of 1 to 30, particularly having a carbon number of 1 to 15, more preferably having a carbon number of 1 to 4, or a hydrogen atom, and are each most preferably a hydrogen atom. $R^4$ to $R^6$ are each an alkyl group typically having a carbon number of 1 to 30, particularly having a carbon number of 1 to 15, more preferably having a carbon number of 1 to 4, or a hydrogen atom, and are each most preferably a hydrogen atom. Particularly, it is most preferred that $R^1$ to $R^6$ are all hydrogen atoms.

In the structural unit represented by the general formula (1), X is typically a single bond.

Alternatively, X may be a bonding chain, as long as the effects of the present invention are not impaired. The bonding chain is not particularly limited, but examples thereof include: hydrocarbon chains such as alkylenes, alkenylenes, alkynylenes, phenylene and naphthylene (which may be substituted with a halogen such as fluorine, chlorine or bromine); ether bonding structures such as —O—, —(CH$_2$O)$_m$—, —(OCH$_2$)$_m$— and —(CH$_2$O)$_m$CH$_2$—; carbonyl-containing structures such as —CO—, —COCO—, —CO(CH$_2$)$_m$CO— and —CO(C$_6$H$_4$)CO—; hetero atom-containing structures including sulfur atom-containing structures such as —S—, —CS—, —SO— and —SO$_2$—, nitrogen atom-containing structures such as —NR—, —CONR—, —NRCO—, —CSNR—, —NRCS—' and —NRNR—, and phosphorus atom-containing structures such as —HPO$_4$—; and metal atom-containing structures including silicon atom-containing structures such as —Si(OR)$_2$—, —OSi(OR)$_2$— and —OSi(OR)$_2$O—, titanium atom-containing structures such as —Ti(OR)$_2$—, —OTi(OR)$_2$— and —OTi(OR)$_2$O—, and aluminum atom-containing structures such as —Al(OR)—, —OAl(OR)— and —OAl(OR)O—, wherein Rs are independently a given substituent, preferably a hydrogen atom or an alkyl group, and m is typically a natural number of 1 to 30, preferably 1 to 15, more preferably 1 to 10. Among these structures, the bonding chain structure is preferably —CH$_2$OCH$_2$— or a C$_{1-10}$ hydrocarbon chain, more preferably a C$_{1-6}$ hydrocarbon chain, particularly preferably a C$_1$ hydrocarbon chain, for stability during production or during use.

The most preferred 1,2-diol structural unit represented by the above general formula (1) is such that R$^1$ to R$^6$ are all hydrogen atoms and X is a single bond. That is, a structural unit represented by the following structural formula (1a) is most preferred:

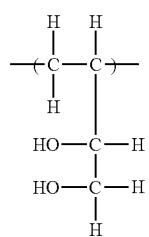

(1a)

Particularly, where the 1,2-diol contains the 1,2-diol structural unit represented by the above general formula (1), the proportion of the 1,2-diol structural unit is typically 0.1 to 20 mol %, preferably 0.1 to 15 mol %, particularly preferably 0.1 to 10 mol %.

A solvent to be used for the solution polymerization is required to be capable of dissolving ethylene, the fatty acid vinyl ester compound and the ethylene-vinyl ester copolymer obtained as a polymerization product, and is typically an alcohol having a carbon number of not greater than 4. Specific examples of the solvent include methyl alcohol, ethyl alcohol, n-propyl alcohol, isopropyl alcohol and t-butyl alcohol, among which methyl alcohol is particularly preferred.

Subsequently, the resulting ethylene-vinyl ester copolymer is saponified. The saponification is carried out in the presence of an alkali catalyst or an acid catalyst in such a state that the ethylene-vinyl ester copolymer prepared in the aforementioned manner is dissolved in an alcohol having a carbon number of not greater than 4 or a hydrous alcohol. Examples of the alcohol having a carbon number of not greater than 4 include methanol, ethanol, propanol and tert-butanol. Where the same solvent is used for the polymerization and for the saponification, a recovery/recycle process can be facilitated without the need for replacement of the solvent. As in the polymerization, methanol is particularly preferred.

Examples of the catalyst to be used for the saponification include alkali catalysts including hydroxides and alcoholates of alkali metals such as sodium hydroxide, potassium hydroxide, sodium methylate, sodium ethylate, potassium methylate and lithium methylate, and acid catalysts such as sulfuric acid, hydrochloric acid, nitric acid, methanesulfonic acid, zeolites and cation-exchange resins, among which sodium hydroxide is typically used.

Although the saponification reaction can be achieved by a known process such as a batch process or a continuous process, it is preferred to continuously carry out the saponification under higher-temperature higher-pressure conditions with the use of a tower type apparatus. This is because the amount of the alkali catalyst to be used for the saponification can be reduced and the saponification reaction can proceed highly efficiently.

The conditions for the saponification with the use of the tower type apparatus are properly determined according to the size of the apparatus and a desired processing rate. Typically, an ethylene-vinyl ester copolymer concentration of 30 to 50 wt %, a reaction temperature of 90° C. to 130° C., a catalyst amount of 6 to 20 mmol per equivalent (per vinyl ester structure unit), a pressure of 0.1 to 1.0 Pa and a reaction period of 1 to 8 hours are preferably used as the conditions for the saponification.

As a result, the EVOH obtained through the saponification is fed out of the reaction system in the form of an alcohol solution.

The resulting EVOH alcohol solution typically contains the alcohol having a carbon number of not greater than 4 in a proportion of not less than 300 parts by weight, particularly 400 to 900 parts by weight, based on 100 parts by weight of the EVOH. The EVOH solution having an alcohol content in this range has sufficient fluidity. Therefore, the EVOH solution can be efficiently taken out of the apparatus, and transferred into the subsequent step.

EVOH Alcohol-Water Replacement Step

The EVOH alcohol solution thus produced is fed into an apparatus, and most of the alcohol in the EVOH alcohol solution is replaced with water in the apparatus to provide a hydrous EVOH.

The apparatus to be used in the replacement step is not particularly limited. The EVOH alcohol solution may be brought into contact with water in a kneading machine such as an extruder or a kneader, but is preferably introduced into a closed vessel and brought into contact with water or water vapor introduced in the closed vessel.

Either a batch process or a continuous process may be employed. In the batch process, the EVOH alcohol solution is preferably brought into contact with water in a tank-type container with stirring. In the continuous process, the EVOH alcohol solution is brought into counter flow contact with water in a tower-type apparatus.

Particularly, the hydrous EVOH to be used in the present invention preferably has a lower alcohol content with the alcohol mostly removed therefrom.

Exemplary processes for efficiently replacing the alcohol with water in the replacement step include a single-stage process employing a single container, and a multistage process employing a plurality of containers.

In the single-stage process employing the single container, as disclosed in JP-A-2002-121290, the EVOH solution is brought into contact with water or water vapor in the container with the resin concentration thereof properly controlled.

Particularly, a two-stage process is preferred, which includes replacement in a tower type apparatus and replacement in an agitator container. This process will hereinafter be described in detail.

(1) Replacement in Tower Type Apparatus

First, a former-stage alcohol-water replacement step to be performed in the tower type apparatus will be described.

The EVOH alcohol solution obtained through the saponification reaction typically contains the alcohol having a carbon number of not greater than 4 in a proportion of not less than 300 parts by weight, particularly 400 to 900 parts by weight, based on 100 parts by weight of the EVOH. If the alcohol content is too high, the production efficiency is reduced in the subsequent alcohol-water replacement step. If the alcohol content is too low, on the other hand, the solution tends to have a higher viscosity, suffering from difficulty in transportation, lower working efficiency, and gelation. The alcohol content of the EVOH alcohol solution may be properly controlled by addition of the alcohol or removal of the alcohol by heating. At this stage, a very small amount of water may be added to the EVOH alcohol solution. A known method may be employed for the addition of water.

Examples of the tower-type apparatus include plate towers such as perforated-plate towers and bubble cap towers, and packed towers. Where the solution has a higher viscosity similar to a polymer solution, the plate towers are preferred for the processing efficiency, and the perforated-plate towers are particularly preferred. Such a plate tower typically has 2 to 20 plates, particularly preferably 5 to 15 plates. Alternatively, a packed tower having a height comparable to that of the plate tower may be used.

The EVOH alcohol solution and the water fed into the tower type apparatus are brought into counter-flow contact or parallel-flow contact with each other. Particularly, the EVOH alcohol solution and the water are preferably brought into counter-flow contact with each other for the alcohol-water replacement efficiency. Hot water or water vapor may be used as the water. Particularly, the water vapor is preferred. For example, it is preferred to feed the EVOH alcohol solution and the water vapor into the tower type apparatus at a tower top and at a tower bottom, respectively, to bring the EVOH alcohol solution and the water vapor into counter-flow contact with each other, then feed out the alcohol vapor together with the water vapor from the tower top, and feed out the EVOH water/alcohol solution from the tower bottom. The EVOH alcohol solution feed-in position is located at a level that is lower than the tower top by two to four stages. Water layers are preferably formed on plates located above this feed-in position by feeding water onto these plates and/or by controlling the amount of the water vapor to be fed out. This prevents droplets of the EVOH and the like from being incorporated in the water/alcohol vapor mixture to be fed out from the tower top, thereby preventing contamination of a vapor transport pipe and a condenser. The water vapor feed-in position is typically located at the tower bottom, but may be located at a level that is higher than the tower bottom by one to two stages. The alcohol/water vapor mixture fed out of the tower is liquefied with the use of a condenser or the like, and separated and refined for recycling.

If the amount of the water vapor to be fed is too small, the efficiency of the replacement of the alcohol is reduced. If the amount of the water vapor to be fed is too great, on the other hand, disadvantageous costs will result. Therefore, the water vapor and the EVOH solution are typically fed into the tower type apparatus in a weight ratio of 0.01 to 30, preferably 0.05 to 10, more preferably 0.07 to 5. The alcohol/water vapor mixture previously fed out of the tower may be refined for recycling to provide the water vapor. A water vapor mixture containing a small amount of the alcohol may also be used. The alcohol content of the water vapor mixture is preferably not higher than 10 parts by weight based on 100 parts by weight of the water vapor, and is preferably smaller, ideally zero, for the alcohol-water replacement efficiency.

The internal temperature of the tower type apparatus is typically 40° C. to 160° C., preferably 60° C. to 150° C., more preferably 70° C. to 140° C. If the temperature is too low, the EVOH solution tends to have a higher viscosity in the apparatus, thereby reducing the replacement efficiency. If the temperature is too high, on the other hand, the EVOH is liable to be degraded.

The internal pressure of the tower type apparatus is typically 0 to 1 MPaG, preferably 0 to 0.6 MPaG, more preferably 0 to 0.3 MPaG. If the pressure is too low, the replacement efficiency is reduced. If the pressure is too high, the internal temperature of the apparatus is liable to be increased, leading to thermal degradation of the EVOH.

The EVOH water/alcohol solution fed out of the tower type apparatus after this step typically contains the alcohol in a proportion of 10 to 200 parts by weight, particularly 10 to 150 parts by weight, further 10 to 100 parts by weight, based on 100 parts by weight of the EVOH. Further, the EVOH water/alcohol solution typically contains water in a proportion of 45 to 200 parts by weight, further 50 to 200 parts by weight, particularly 60 to 150 parts by weight, further 70 to 120 parts by weight, based on 100 parts by weight of the EVOH. If the alcohol content and the water content are too high, the subsequent stirring/replacement step tends to be burdensome. If the alcohol content and the water content are too low, the EVOH water/alcohol solution tends to have a higher viscosity, thereby reducing the replacement efficiency in the latter half of the tower type apparatus. Further, it is difficult to feed out the EVOH water/alcohol solution from the tower type apparatus.

(2) Replacement in Agitator Container

The resulting EVOH water/alcohol solution is brought into contact with water with stirring in the agitator container in the next step, whereby the alcohol is replaced with water. At the same time, water is released from the EVOH. Thus, a lower water content EVOH composition is provided.

The shape of the container to be used in this step is not particularly limited. The container desirably includes temperature regulating means such as a jacket, and an agitator. The shape of an agitation impeller of the agitator is not particularly limited, but any of the known agitation impellers may be employed, as long as the high viscosity EVOH composition can be stirred. Examples of the agitation impeller include a paddle impeller, a double helical ribbon impeller, an anchor impeller, a propeller impeller and a Max-blend impeller. The stirring may be either continuous or intermittent.

The water may be continuously or intermittently fed into the container, and the water may be hot water or water vapor. The feeding of an excessively small amount of water reduces the alcohol replacement efficiency. On the other hand, the feeding of an excessively great amount of water is uneconomical, because the feed-out rate of the water to be fed out of the container is not compatible with the feed-in rate of the water. The water feed-in rate is typically 0 to 35 parts by weight/hr, particularly 10 to 32 parts by weight/hr, further 14 to 23 parts by weight/hr, based on 100 parts by weight of the EVOH fed into the container.

The internal temperature of the container is typically 40° C. to 140° C., preferably 60° C. to 120° C., more preferably 80° C. to 100° C. An excessively low temperature reduces the fluidity in the system, so that the transfer of the product to the next step is difficult. On the other hand, an excessively high temperature tends to thermally degrade the EVOH.

The internal pressure of the container is typically an ordinary pressure, but may be higher than the ordinary pressure. The internal pressure is typically 0 to 1 MPaG, particularly 0 to 0.6 MPaG, more preferably 0 to 0.3 MPaG. An excessively high pressure tends to increase the internal temperature of the container, leading to thermal degradation of the EVOH.

The water fed into the container is fed out together with the alcohol released from the resin. Exemplary methods for feeding out the water include a method in which the water is caused to overflow from the top of the container, and a method in which the water is fed out in the form of a water/alcohol vapor mixture. These methods are preferably employed in combination.

The replacement by the stirring in the container may be a continuous process or a batch process. The batch process may be a single-stage process, or a multistage process employing a plurality of containers arranged in series. In the latter case, it is possible to control the retention time and to finely control the resin component. Further, the multistage process is advantageous because additives to be described later can be blended in the respective containers.

In the step of replacing the alcohol with water in the agitator container, additives generally employed for the EVOH may be added to the EVOH. Thus, the EVOH can contain the additives.

For example, additives such as a carboxylic compound, a boron compound and a phosphoric compound are often added to the EVOH for improvement of thermal stability and other qualitative properties. In a conventional EVOH pellet production method, it is a practice to first pelletize the EVOH, then immerse the resulting pellets in an aqueous solution containing any of the aforementioned additives, and dewater and dry the pellets, whereby the EVOH pellets are allowed to contain the additives. However, this method additionally requires an additive adding step, and it is difficult to control the additive content of the EVOH. Further, the additives are liable to be locally present in the EVOH. In the inventive production method, the additives are added in the respective containers as described above, so that the EVOH can quantitatively contain the additives without the need for additionally providing the additive adding step. Thus, the inventive production method is advantageous in many aspects.

Exemplary methods for blending the additives include a method in which the additives are added directly to the EVOH water/alcohol mixture solution obtained in the previous step, and a method in which the additives are added to the water to be brought into contact with the EVOH water/alcohol mixture solution and the resulting aqueous solution is fed into the system. Particularly, the latter method is preferred.

In this case, the amounts of the respective compounds present in the aqueous solution are properly controlled so that the EVOH to be finally obtained can contain the respective compounds in desired amounts. In the aqueous solution, the carboxylic compound is preferably present in an amount of 10 to 500 ppm, the boron compound is preferably present in an amount of 1 to 50 ppm, and the phosphoric compound is preferably present in an amount of 10 to 50 ppm.

Typically usable as the carboxylic compound is a $C_{2-4}$ carboxylic compound, which is preferably monovalent or divalent. Specific examples of the carboxylic compound include oxalic acid, succinic acid, benzoic acid, citric acid, acetic acid, propionic acid and lactic acid, and alkali metal salts, alkali earth metal salts and zinc group salts of these carboxylic acids, among which acetic acid and propionic acid, and/or alkali metal salts of these carboxylic acids are preferred for costs and availability.

If the carboxylic compound is present in an excessively small amount in the EVOH pellets obtained in the present invention, the EVOH is liable to be colored during the melt-forming. If the amount of the carboxylic compound is too great, the EVOH is liable to have a higher melt viscosity. The amount of the carboxylic compound is typically 10 to 5000 ppm, particularly 30 to 1000 ppm, preferably 50 to 500 ppm.

Examples of the boron compound include boric compounds such as boric acids, boric esters and boric salts, and hydrogenated boron compounds, among which boric acids and boric salts are preferred but not limitative. Specific examples of the boric acids include orthoboric acid, metaboric acid and tetraboric acid. Specific examples of the boric esters include triethyl borate and trimethyl borate. Specific examples of the boric salts include alkali metal salts and alkali earth metal salts of the above boric acids, and borax. Among these compounds, orthoboric acid (hereinafter referred to simply as "boric acid") is preferred. The boron compound is typically present in an amount of 10 to 2000 ppm, particularly preferably 50 to 1000 ppm, on a boron basis in the EVOH pellets obtained in the present invention. If the amount of the boron compound is too small, the effect of improving the thermal stability is insufficient. If the amount of the boron compound is too great, the gelation is liable to occur, resulting in a forming failure.

Examples of the phosphoric compound include phosphoric acid, phosphorous acid and other phosphor containing acids, and salts of these acids. The phosphoric salts may be in the form of a monobasic phosphate, a dibasic phosphate or a tribasic phosphate, and their cationic moieties are not particularly limited. Preferred examples of the phosphoric salts include alkali metal salts and alkali earth metal salts. Particularly, sodium dihydrogen phosphate, potassium dihydrogen phosphate, disodium hydrogen phosphate or dipotassium hydrogen phosphate is preferably added as the phosphoric compound. The phosphoric compound is typically present in an amount of 1 to 1000 ppm on a phosphate moiety basis in the EVOH pellets obtained in the present invention. The coloration, the gelation and a fish-eye of a formed product can be suppressed by adding the phosphoric compound in an amount of the aforementioned range. If the amount of the phosphoric compound is too small, the coloration is liable to occur during the melt-forming. If the amount of the phosphoric compound is too great, a formed product is liable to suffer from the gelation and the fish-eye.

The resulting hydrous EVOH typically has a water content of higher than 40 wt % and not higher than 100 wt %, preferably 45 to 80 wt %, particularly preferably 50 to 70 wt % (based on the overall weight of the EVOH). If the water content is too low, the temperature of the resin is liable to rise in the kneading machine in the subsequent dewatering step, causing thermal degradation of the resin. If the water content is too high, the amount of the water to be removed is excessively great, so that vents are liable to be clogged.

The resulting hydrous EVOH may contain the alcohol yet to be removed, and the alcohol content of the hydrous EVOH is typically less than 10 wt % (based on the overall weight of the hydrous EVOH).

Description of PVA

Next, the PVA to be used in the present invention will be described.

The PVA to be used in the present invention is typically prepared by saponifying a polyvinyl ester obtained by polymerizing a fatty acid vinyl ester such as vinyl acetate, and contains a vinyl alcohol structural unit as a main component and a very small amount of a vinyl ester structural unit depending on the saponification degree.

Generally, vinyl acetate is employed in industry as the vinyl ester monomer for economical and productive reasons. Other examples of the vinyl ester monomer include those employed for the EVOH.

A copolymerizable ethylenically unsaturated monomer may be used in addition to the fatty acid vinyl ester compound for the copolymerization, as long as the properties required for the PVA are not impaired. Examples of the monomer include: olefins such as ethylene, propylene, 1-butene and isobutene; hydroxyl-containing α-olefins such as 2-propen-1-ol, 3-buten-1-ol, 4-penten-1-ol, 5-hexen-1-ol, 3,4-dihydroxy-1-butene and 5-hexene-1,2-diol, and acylation products and esterification products thereof (e.g., 3,4-diacyloxy-1-butene, particularly 3,4-diacetoxy-1-butene); unsaturated acids such as acrylic acid, methacrylic acid, crotonic acid, (anhydrous) phthalic acid, (anhydrous) maleic acid and (anhydrous) itaconic acid, and salts thereof and $C_{1-18}$ monoalkyl or dialkyl esters thereof; acrylamides such as acrylamide, $C_{1-18}$ N-alkylacrylamides, N,N-dimethylacrylamide, 2-acrylamidepropanesulfonic acid and salts thereof, and acrylamidepropyldimethylamine, acid salts thereof and quaternary salts thereof; methacrylamides such as methacrylamide, $C_{1-18}$ N-alkylmethacrylamides, N,N-dimethylmethacrylamide, 2-methacrylamidepropanesulfonic acid and sails thereof, and methacrylamidepropyldimethylamine, acid salts thereof and quaternary salts thereof; N-vinylamides such as N-vinylpyrrolidone, N-vinylformamide and N-vinylacetamide; vinyl cyanates such as acrylonitrile and methacrylonitrile; vinyl ethers such as $C_{1-18}$ alkyl vinyl ethers, hydroxyalkyl vinyl ethers and alkoxyalkyl vinyl ethers; halogenated vinyls such as vinyl chloride, vinylidene chloride, vinyl fluoride, vinylidene fluoride and vinyl bromide; vinylsilanes such as trimethoxyvinylsilane; and allyl chloride, trimethyl-(3-acrylamide-3-dimethylpropyl)ammonium chloride, acrylamide-2-methylpropanesulfonic acid, vinylethylene carbonate and glycerol monoallyl ether. Where the aforesaid monomer is a hydrophobic monomer such as ethylene or propylene, the proportion of the monomer is typically less than 0.1 mol %.

Particularly, the PVA is preferably prepared through copolymerization of a hydrophilic monomer. Particularly, the PVA preferably contains any of the hydroxyl-containing α-olefins. In this case, the PVA has a reduced melting point, permitting melt-forming with the use of an extruder. The PVA typically contains any of the hydroxyl-containing α-olefins, the acylation products and the esterification products thereof in a proportion of 0.1 to 30 mol %, preferably 1 to 10 mol %.

A PVA having 1,2-diol at its side chain contains a 1,2-diol structural unit at its side chain. More specifically, the 1,2-diol structural unit is the following structural unit (2):

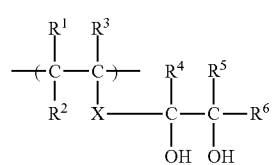

(2)

wherein $R^1$, $R^2$ and $R^3$ are independently a hydrogen atom or an organic group, X is a single bond or a bonding chain, and $R^4$, $R^5$ and $R^6$ are independently a hydrogen atom or an organic group.

The organic group in the 1,2-diol structural unit represented by the above general formula (2) is not particularly limited, but examples thereof include saturated hydrocarbon groups such as a methyl group, an ethyl group, a n-propyl group, an isopropyl group, a n-butyl group, an isobutyl group and a tert-butyl group, aromatic hydrocarbon groups such as a phenyl group and a benzyl group, halogen groups, a hydroxyl group, acyloxy groups, alkoxycarbonyl groups, a carboxyl group and a sulfonic group.

In the above general formula (2), $R^1$ to $R^3$ are each a saturated hydrocarbon group typically having a carbon number of 1 to 30, particularly having a carbon number of 1 to 15, more preferably having a carbon number of 1 to 4, or a hydrogen atom, and are each most preferably a hydrogen atom. $R^4$ to $R^6$ are each an alkyl group typically having a carbon number of 1 to 30, particularly having a carbon number of 1 to 15, more preferably having a carbon number of 1 to 4, or a hydrogen atom, and are each most preferably a hydrogen atom. Particularly, it is most preferred that $R^1$ to $R^6$ are all hydrogen atoms.

In the structural unit represented by the general formula (2), X is typically a single bond.

Alternatively, X may be a bonding chain, as long as the effects of the present invention are not impaired. The bonding chain is not particularly limited, but examples thereof include: hydrocarbon chains such as alkylenes, alkenylenes, alkynylenes, phenylene and naphthylene (which may be substituted with a halogen such as fluorine, chlorine or bromine); ether bonding structures such as —O—, —(CH$_2$O)$_m$—, —(OCH$_2$)$_m$— and —(CH$_2$O)$_m$CH$_2$—; carbonyl-containing structures such as —CO—, —COCO—, —CO(CH$_2$)$_m$CO— and —CO(C$_6$H$_4$)CO—; hetero atom-containing structures including sulfur atom-containing structures such as —S—, —CS—, —SO— and —SO$_2$—, nitrogen atom-containing structures such as —NR—, —CONR—, —NRCO—, —CSNR—, —NRCS— and —NRNR—, and phosphorus atom-containing structures such as —HPO$_4$—; and metal atom-containing structures including silicon atom-containing structures such as —Si(OR)$_2$—, —OSi(OR)$_2$— and —OSi(OR)$_2$O—, titanium atom-containing structures such as —Ti(OR)$_2$—, —OTi(OR)$_2$— and —OTi(OR)$_2$O—, and aluminum atom-containing structures such as —Al(OR)—, —OAl(OR)— and —OAl(OR)O—, wherein Rs are independently a given substituent, preferably a hydrogen atom or an alkyl group, and m is typically a natural number of 1 to 30, preferably 1 to 15, more preferably 1 to 10. Among these structures, the bonding chain structure is preferably —CH$_2$OCH$_2$— or a $C_{1-10}$ hydrocarbon chain, more preferably a $C_{1-6}$ hydrocarbon chain, particularly preferably a $C_1$ hydrocarbon chain.

The most preferred 1,2-diol structural unit represented by the above general formula (2) is such that $R^1$ to $R^6$ are all hydrogen atoms and X is a single bond. That is, a structural unit represented by the following structural formula (2a) is most preferred:

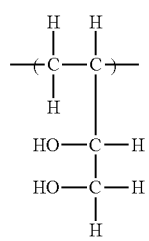

Particularly, where the 1,2-diol contains the 1,2-diol structural unit represented by the above general formula (2), the proportion of the 1,2-diol structural unit is typically 0.1 to 20 mol %, preferably 0.1 to 15 mol %, particularly preferably 0.1 to 10 mol %.

The method for the polymerization of the vinyl ester monomer (and other copolymerizable monomer) is not particularly limited, but a known polymerization process such as bulk polymerization, solution polymerization, suspension polymerization, dispersion polymerization or emulsion polymerization may be employed. Typically, the solution polymerization is employed.

Exemplary solvents to be used for the polymerization include $C_{1-5}$ aliphatic alcohols such as methanol, ethanol, isopropyl alcohol, n-propanol and butanol, and $C_{1-5}$ ketones such as acetone and methyl ethyl ketone. In an industrial process, any of the $C_{1-5}$ aliphatic alcohols, particularly methanol, is preferably used.

The amount of the solvent to be used is properly selected according to the polymerization degree of the intended copolymer in consideration of the chain-transfer constant of the solvent. Where methanol is used as the solvent, for example, the amount of the solvent to be used is selected so that the solvent-to-monomer weight ratio S/M is typically 0 to 20, preferably 0.01 to 10.

A known polymerization catalyst may be employed. Particularly, a polymerization catalyst having a short half period is preferred for color hue and other qualitative properties. The short-half-period polymerization catalyst is such that the one-hour half-period temperature thereof at which the polymerization catalyst has a half period of one hour is typically 10° C. to 90° C., preferably 30° C. to 80° C., particularly preferably 40° C. to 70° C. If the one-hour half-period temperature is too high, the catalytic activity is lower. Therefore, the resulting resin is liable to suffer from coloration with the need for using a greater amount of the polymerization catalyst. If the one-hour half-period temperature is too low, the productivity tends to be reduced.

The catalyst typically has a one-minute half-period temperature of 80° C. to 130° C. and a ten-hour half-period temperature of 30° C. to 65° C. Further, the catalyst typically has an activation energy of 25000 to 32000 kcal.

The half periods and the half-period temperatures are determined through the iodine titration technique using an iodide as a reducing agent.

Specific examples of the polymerization catalyst include peroxyesters such as t-butyl peroxyneodecanoate (having a one-hour half-period temperature of 65° C.), α,α'-bis(neodecanoylperoxy)diisopropylbenzene, cumyl peroxyneodecanoate (having a one-hour half-period temperature of 56° C.), 1,1,3,3-tetramethylbutyl peroxyneodecanoate (having a one-hour half-period temperature of 59° C.), 1-cyclohexyl-1-methylethyl peroxyneodecanoate, t-hexyl peroxyneodecanoate (having a one-hour half-period temperature of 63° C.), 3-hydroxy-1,1-dimethylbutyl peroxydecanoate (having a one-hour half-period temperature of 54° C.), tert-amyl peroxydecanoate (having a one-hour half-period temperature of 64° C.), tert-butyl peroxyneoheptanoate (having a one-hour half-period temperature of 68° C.), tert-hexyl peroxypivalate (having a one-hour half-period temperature of 71° C.), tert-butyl peroxyneoheptanoate (having a one-hour half-period temperature of 72° C.), tert-amyl peroxypivalate (having a one-hour half-period temperature of 74° C.) and tert-butyl peroxypivalate (having a one-hour half-period temperature of 74° C.), peroxydicarbonates such as di-n-propyl peroxydicarbonate (having a one-hour half-period temperature of 58° C.), di-isopropyl peroxydicarbonate (having a one-hour half-period temperature of 59° C.), di-sec-butyl peroxydicarbonate (having a one-hour half-period temperature of 63° C.), bis(4-t-butylcyclohexyl) peroxydicarbonate (having a one-hour half-period temperature of 58° C.), di-2-ethoxyethyl peroxydicarbonate, di(2-ethylhexyl) peroxydicarbonate (having a one-hour half-period temperature of 60° C.), di-3-methoxybutyl peroxydicarbonate (having a one-hour half-period temperature of 57° C.), di(3-methyl-3-methoxybutylperoxy)dicarbonate and dibutyl peroxydicarbonate (having a one-hour half-period temperature of 65° C.), diacyl peroxides such as diisobutyryl peroxide (having a one-hour half-period temperature of 51° C.), dilauryl peroxide (having a one-hour half-period temperature of 80° C.), diisononanoyl peroxide (having a one-hour half-period temperature of 78° C.), bis-3,5,5-trimethylhexanoyl peroxide (having a one-hour half-period temperature of 78° C.) and di(3,5,5-trimethylhexanoyl) peroxide (having a one-hour half-period temperature of 77° C.), and other peroxide radical polymerization catalysts. These compounds are commercially available from Kayaku Akzo Corporation, NOF Corporation, Arkema Yoshitomi, Ltd. and the like.

The amount of the catalyst to be used varies depending on the type of the comonomer and the type of the catalyst. Therefore, the amount of the catalyst cannot be generally determined, but may be properly selected according to the polymerization speed. For the vinyl ester monomer, the amount of the catalyst is typically 0.01 to 0.5 mol %, preferably 0.01 to 0.1 mol %, particularly preferably 0.01 to 0.05 mol %. If the amount is too small, the polymerization speed is reduced, or the polymerization is stopped, thereby reducing the productivity. If the amount is too great, coloration tends to occur.

The polymerization temperature is typically 30° C. to 200° C., preferably 35° C. to 150° C., particularly 40° C. to 80° C. If the polymerization temperature is too low, the polymerization does not properly proceed, thereby reducing the productivity. If the polymerization temperature is too high, on the other hand, the polymerization degree is not easily increased.

It is preferred to carry out the polymerization at the boiling point of the solvent to be used, because polymerization reaction heat is properly suppressed by the vaporization heat of the solvent. The polymerization temperature is not necessarily required to be kept constant until the completion of the polymerization, but may be fluctuated during the polymerization.

The polymerization period varies depending on the type of the polymerization catalyst to be used, but is typically 1 to 10 hours, preferably 5 to 8 hours. If the polymerization period is too short, the residual amount of the catalyst is increased, thereby resulting in reduction in whiteness and the uncontrollability of the polymerization. If the polymerization period is too long, the productivity tends to be reduced.

The polymerization is typically carried out at an ordinary pressure, but may be carried out at an increased pressure. The polymerization percentage is typically 40 to 99%, preferably 50 to 90%, particularly preferably 60 to 90%.

Any of the known polymerization methods may be employed for the polymerization, and examples of the known methods include: (1) a method in which the carboxyl-containing monomer, the vinyl ester monomer, the polymerization catalyst and the solvent are supplied into a polymerization vessel and the polymerization is allowed to proceed (bulk supply method); (2) a method in which, after the monomers and the solvent are supplied into a polymerization vessel and the system temperature is increased to the polymerization temperature, the polymerization catalyst is supplied into the polymerization vessel and the polymerization is allowed to proceed (bulk supply method); (3) a method in which, after the polymerization catalyst and the solvent are supplied into a polymerization vessel, the monomers are separately or simultaneously supplied (dropwise) into the polymerization vessel under the polymerization conditions and the polymerization is allowed to proceed (separate supply method); and (4) a method in which, after the solvent, the polymerization catalyst and one of the monomers are supplied into a polymerization vessel, the other monomer is supplied dropwise into the polymerization vessel under the polymerization conditions, or a part of the solvent and/or the polymerization catalyst and the other monomer are supplied together into the polymerization vessel (separate supply method). These methods may be employed in combination.

After the polymerization is allowed to proceed to a desired polymerization degree, a polymerization inhibitor is added to the resulting polymerization product. Examples of the polymerization inhibitor include quinone derivatives such as 4-methoxyphenol and benzoquinone, nitro-containing compounds such as m-dinitrobenzene, piperidine derivatives such as 4-hydroxy-2,2,6,6-tetramethylpiperidine-1-oxyl, and unsaturated carboxylic derivatives such as sorbic acid.

In the present invention, the polymerization inhibitor is used in a small amount for preparation of the carboxyl-containing PVA. The amount of the polymerization inhibitor to be used varies depending on the type of the catalyst, but typically 1 to 200 ppm, preferably 10 to 100 ppm, particularly preferably 10 to 90 ppm, based on the overall amount of the polymerization product obtained at the termination of the polymerization. If the amount of the polymerization inhibitor is too small, post-polymerization is liable to occur, contaminating the resulting product with impurities. If the amount of the polymerization inhibitor is too great, the color hue is liable to be deteriorated in the saponification step.

The polymerization inhibitor may be used in a liquid form or a solid form, or may be diluted in an appropriate solvent. The dilution solvent may be properly selected according to the type of the polymerization inhibitor, and examples of the dilution solvent include $C_{1-4}$ aliphatic alcohols such as methanol, ethanol and tert-butanol, aliphatic hydrocarbons such as hexane and isoparaffin, and aromatic hydrocarbons such as benzene and dimethyl phthalate, which may be used in combination.

The active polymerization catalyst preferably remains in a small amount in the PVA. The amount of the remaining active polymerization catalyst is typically 0.1 to 40 ppm, preferably 0.1 to 30 ppm, particularly preferably 0.1 to 10 ppm, based on the overall amount of the polymerization product obtained at the termination of the polymerization. If the amount of the remaining active polymerization catalyst is too great, the color hue is liable to be deteriorated during the saponification reaction.

Then, the resulting copolymer is saponified. For the saponification, the copolymer is dissolved in a solvent such as an alcohol, and an alkaline catalyst or an acid catalyst is used. Typical examples of the solvent include $C_{1-4}$ alcohols such as methanol, ethanol, propanol and tert-butanol, among which methanol is particularly preferred. The concentration of the copolymer in the alcohol is properly selected according to the viscosity of the system, but typically 5 to 60 wt %. Examples of the catalyst to be used for the saponification include: alkali catalysts including hydroxides of alkali metals such as sodium hydroxide and potassium hydroxide, and alkoxides of alkali metals such as sodium methylate, sodium ethylate, potassium methylate and lithium methylate; and acid catalysts including inorganic acids such as sulfuric acid, hydrochloric acid and nitric acid, sulfonic compounds such as methanesulfonic acid, zeolites and cation exchange resins. Preferably, any of the alkali metal hydroxides is used.

The amount of the saponification catalyst is typically 0.1 to 200 mmol, preferably 10 to 100 mmol, per 1 mol of the acyl group of the vinyl ester monomer. If the amount of the saponification catalyst is too great, the color hue tends to be deteriorated. If the amount of the saponification catalyst is too small, it is difficult to provide a higher saponification degree. A temperature for the saponification reaction is not particularly limited, but is preferably 10° C. to 60° C., more preferably 20° C. to 50° C.

A continuous process or a batch process may be employed for the saponification. A kneader, a ribbon blender or the like may be employed as a saponification apparatus for the batch process.

PVA Alcohol/Water Replacement Step

The alcohol in the PVA alcohol solution thus prepared is mostly replaced with water by properly adding water to the PVA alcohol solution while removing the alcohol from the PVA alcohol solution by blowing water vapor into the PVA alcohol solution, or by immersing a cake of the PVA having a moderately reduced alcohol content in cold water. Thus, a hydrous PVA is provided.

Inventive Vinyl Alcohol Resin Production Method (Dewatering Process Employing Kneading Machine)

Subsequently, the hydrous vinyl alcohol resin prepared in the aforementioned manner is fed into a kneading machine, and passed through a plurality of kneading areas to be dewatered while being kneaded without contact with oxygen. Thus, a lower water content vinyl alcohol resin is provided.

A feature of the present invention is that the water content of the hydrous vinyl alcohol resin is reduced to an intermediate level in a former-stage kneading area and finally to not greater than 10 wt % in a latter-stage or final-stage kneading area.

Particularly, the hydrous vinyl alcohol resin is moderately dewatered at a sufficient processing rate in the former-stage kneading area by suppressing the temperature rise of the hydrous vinyl alcohol resin, and the water content of the resin is steeply reduced in the final-stage kneading area. This makes it possible to efficiently dewater the hydrous vinyl alcohol resin. Since the water content of the resin is reduced to some extent in the former-stage kneading area, the resin is dewatered at a higher processing rate in the final-stage kneading area.

In the present invention, the term "kneading area" means an area in which the resin is kneaded positively. A non-kneading area (transport area) is present between the kneading areas. The plurality of kneading areas may be defined by a plurality of kneading machines, or by a single apparatus having a plurality of kneading areas therein.

Where the plural kneading machines are employed, for example, a feed pipe is provided between the kneading machines. The inside of the transport pipe, in which the resin is not positively kneaded, is a non-kneading area. Where the single apparatus having the plurality of kneading areas therein is employed, an area in which the resin is not positively kneaded but merely transported is a non-kneading area.

A smaller number of kneading areas are preferably provided for productivity. The number of the kneading areas is typically 2 to 10, preferably 2 to 5, particularly preferably 2 to 3.

The water contents of the hydrous vinyl alcohol resin in the former-stage and latter-stage (final-stage) kneading areas will be described. In the former-stage kneading area, the hydrous vinyl alcohol resin is preferably dewatered to a water content of 20 to 40 wt %, particularly preferably 30 to 40 wt %. If the water content of the hydrous vinyl alcohol resin passed through the former-stage kneading area is too high, it is difficult to sufficiently dewater the resin in the final-stage kneading area, thereby reducing the processing efficiency. If the water content of the hydrous vinyl alcohol resin passed through the former-stage kneading area is too low, on the other hand, the time required for the dewatering at the former stage is prolonged, thereby reducing the processing efficiency.

The hydrous vinyl alcohol resin passed through the former-stage kneading area is then fed into the final-stage kneading area, and kneaded and dewatered typically to a water content of not higher than 10 wt %, preferably to a water content of not higher than 4 wt %. Where the water content is lower, air bubbles are less liable to be trapped in a product produced by melt-forming the resulting vinyl alcohol resin. Therefore, the water content is further preferably not higher than 3 wt %, particularly preferably not higher than 2 wt %.

In the present invention, the water content of the hydrous vinyl alcohol resin is based on the overall weight of the hydrous vinyl alcohol resin, unless otherwise specified.

The temperatures of the resin in the respective kneading areas vary depending on a desired resin processing rate, but typically 140° C. to 240° C. Even if the temperature of the hydrous vinyl alcohol resin is higher, the inventive method suppresses the coloration of the resin which may otherwise occur due to degradation of the resin. For the dewatering efficiency, therefore, it is effective to dewater the resin at a higher temperature. More specifically, the resin temperature is 180° C. to 220° C., particularly preferably 190° C. to 200° C.

Particularly, the temperature is preferably controlled at 140° C. to 180° C., particularly preferably 150° C. to 170° C., in the former-stage kneading area, and is preferably controlled at 150° C. to 240° C., particularly preferably 150° C. to 200° C., in the final-stage kneading area.

If the temperature of the hydrous vinyl alcohol resin is too high in the former-stage kneading area, the dewatering rate is increased, but the output rate tends to be reduced. If the temperature of the hydrous vinyl alcohol resin is too low in the former-stage kneading area, on the other hand, the dewatering rate tends to be insufficient. If the temperature of the hydrous vinyl alcohol resin is too high in the final-stage kneading area, the resin is liable to be degraded to be colored. If the temperature of the hydrous vinyl alcohol resin is too low in the final-stage kneading area, on the other hand, it is often impossible to provide the lower water content vinyl alcohol resin.

Particularly, the temperature of the hydrous vinyl alcohol resin should be higher in the final-stage kneading area than in the former-stage kneading area, and a difference in the temperature of the hydrous vinyl alcohol resin (a resin temperature in the final-stage kneading area minus a resin temperature in the former-stage kneading area) is preferably 10° C. to 100° C., particularly preferably 10° C. to 50° C.

When the hydrous vinyl alcohol resin is kneaded and dewatered in the plural kneading areas, the ratio of the total weight of water removed in the former-stage kneading area to the weight of water removed in the final-stage kneading area (former stage/final stage) is typically 50/50 to 5/95, particularly preferably 50/50 to 30/70, more preferably 50/50 to 40/60. If the weight ratio is too great or too small, the dewatering efficiency tends to be reduced at the former stage, thereby reducing the savings.

When the hydrous vinyl alcohol resin is kneaded and dewatered in the plural kneading areas, the ratio of the retention time of the hydrous vinyl alcohol resin in the former-stage kneading area to the retention time of the hydrous vinyl alcohol resin in the final-stage kneading area (former stage/final stage) is 1/2 to 10/1, particularly preferably 1/1 to 5/1, further preferably 1/1 to 3/1. If the retention time ratio is too great or too small, the dewatering efficiency tends to be reduced at the former stage, thereby reducing the savings.

The retention time in the former-stage kneading area is typically 0.1 to 10 minutes, preferably 0.1 to 5 minutes, particularly preferably 0.1 to 3 minutes. The retention time in the final-stage kneading machine is typically 0.1 to 5 minutes, preferably 0.1 to 3 minutes, particularly preferably 0.1 to 2 minutes.

The type of a kneading blade provided as a kneading device in each of the kneading areas is not particularly limited, but any of the known kneading blades capable of kneading the hydrous vinyl alcohol resin which later becomes highly viscous may be employed. Exemplary types of the kneading blade include a screw type, a paddle type and a ribbon type.

Examples of the kneading machine include an extruder, a kneader and a mixer. The kneading machine typically has a drain port for the dewatering.

A case in which the extruder is employed as the kneading machine will hereinafter be described in detail.

In the present invention, a plurality of extruders, for example, are employed for the multistage dewatering in the dewatering process. Particularly, the hydrous vinyl alcohol resin is moderately dewatered at a sufficient processing rate in the former-stage extruder by suppressing the temperature rise of the hydrous vinyl alcohol resin, and kneaded at a higher temperature and efficiently further dewatered by increasing the cylinder setting temperature or the rotation speed of the final-stage extruder. At the final stage, the hydrous vinyl alcohol resin is dewatered at a higher processing rate, because the water content is reduced to some extent at the former stage.

In the present invention, the hydrous vinyl alcohol is preferably dewatered to a water content of 20 to 40 wt %, particularly preferably 30 to 40 wt %, in the former-stage extruder. If the water content of the hydrous vinyl alcohol resin extruded from the former-stage extruder is too high, the final-stage extruder fails to provide a sufficient extrusion rate. If the water content is too low, on the other hand, the extrusion rate tends to be insufficient at the former stage.

The hydrous vinyl alcohol resin extruded from the former-stage extruder is fed into the final-stage extruder, and kneaded and dewatered typically to a water content of not higher than 10 wt %, preferably a water content of not higher than 4 wt %, in the same manner as described above. Where the water content is lower, air bubbles are less liable to be trapped in a product produced by melt-forming the resulting vinyl alcohol resin. Therefore, the water content is further preferably not higher than 3 wt %, particularly preferably not higher than 2 wt %.

When the hydrous vinyl alcohol resin is kneaded and dewatered in the plural extruders, the ratio of the weight of water removed in the former-stage extruder to the weight of water removed in the final-stage extruder (former stage/final stage) is typically 50/50 to 5/95, particularly preferably 50/50 to 30/70, more preferably 50/50 to 40/60. If the weight ratio is too great or too small, the dewatering efficiency tends to be reduced at the former stage, thereby reducing the savings.

When the hydrous vinyl alcohol resin is kneaded and dewatered in the plural extruders, the ratio of the retention time of the hydrous vinyl alcohol resin in the former-stage extruder to the retention time of the hydrous vinyl alcohol resin in the final-stage extruder is typically 1/2 to 10/1, particularly preferably 1/1 to 5/1, further preferably 1/1 to 3/1. If the retention time ratio is too great or too small, the dewatering efficiency tends to be reduced at the former stage, thereby reducing the savings.

The retention time in the former-stage extruder is typically 0.1 to 10 minutes, preferably 0.1 to 5 minutes, particularly preferably 0.1 to 3 minutes. The retention time in the final-stage extruder is typically 0.1 to 5 minutes, preferably 0.1 to 3 minutes, particularly preferably 0.1 to 2 minutes.

Any of the known extruders maybe used at the former stage and at the final stage. Specific examples of the extruder include a single screw extruder and a twin screw extruder. Particularly, a twin screw extruder with its screws rotatable in the same direction is preferred, because it ensures sufficient kneading by proper shearing. The former-stage and final-stage extruders typically each have an L/D ratio of 10 to 80, particularly 15 to 70, preferably 15 to 60. If the L/D ratio is too low, the extrusion is liable to be unstable due to insufficient kneading. If the L/D ratio is too high, on the other hand, unwanted heating tends to occur due to excessive shearing to increase the resin temperature, deteriorating the resin.

The screw rotation speeds of the former-stage and final-stage extruders each vary depending on the cylinder diameter and the screw configuration thereof, but are typically 10 to 400 rpm, particularly 30 to 300 rpm, preferably 50 to 250 rpm.

If the rotation speed of the former-stage extruder is too high, the shear heating of the hydrous vinyl alcohol resin is enhanced to increase the dewatering rate but reduce the extrusion rate. If the rotation speed of the former-stage extruder is too low, on the other hand, the dewatering rate is excessively reduced. If the rotation speed of the final-stage extruder is too high, the resin is liable to be degraded due to excessive shear heating, resulting in coloration. If the rotation speed of the final-stage extruder is too low, on the other hand, the dewatering is insufficient, and the extrusion is liable to be unstable.

Although the screw rotation speeds of the former-stage and final stage extruders each vary depending on the cylinder diameter and the screw configuration thereof, the final-stage extruder preferably has a higher screw rotation speed than the former-stage extruder. The ratio of the screw rotation speed of the former-stage extruder to the screw rotation speed of the final stage extruder is not lower than 1/10 (=0.1) and lower than 1/1 (=1), particularly preferably 1/1.5 to 1/5.

The ratio ((a)/(b)) of the power (a) of the final-stage extruder to the highest one (b) of the powers of the other extruders (the power of the former-stage extruder in this embodiment) is typically not less than 1, preferably 1.1 to 50, more preferably 1.5 to 10, particularly preferably 2 to 5.

The temperatures of the resin in the extruders each vary depending on a desired processing rate and the like, but typically 140° C. to 240° C. Even if the temperature of the hydrous vinyl alcohol resin is higher, the inventive method suppresses the coloration of the resin which may otherwise occur due to degradation of the resin. For the dewatering efficiency, therefore, it is effective to dewater the resin at a higher temperature. More specifically, the resin temperature is 180° C. to 220° C., particularly preferably 190° C. to 200° C.

Particularly, the temperature is preferably controlled at 140° C. to 180° C., particularly preferably 150° C. to 170° C., in the former-stage extruder, and is preferably controlled at 150° C. to 240° C., particularly preferably 150° C. to 200° C., in the final-stage extruder.

If the temperature of the hydrous vinyl alcohol resin is too high in the former-stage extruder, the dewatering rate is increased, but the extrusion rate tends to be reduced. If the temperature of the hydrous vinyl alcohol resin is too low in the former-stage extruder, on the other hand, the dewatering rate tends to be insufficient. If the temperature of the hydrous vinyl alcohol resin is too high in the final-stage extruder, the resin is liable to be degraded to be colored. If the temperature of the hydrous vinyl alcohol resin is too low in the final-stage extruder, on the other hand, it is often impossible to provide the lower water content vinyl alcohol resin.

Particularly, the temperature of the hydrous vinyl alcohol resin should be higher in the final-stage extruder than in the former-stage extruder, and a difference in the temperature of the hydrous vinyl alcohol resin (a resin temperature in the final-stage extruder minus a resin temperature in the former-stage extruder) is preferably 10° C. to 100° C., particularly preferably 10° C. to 50° C.

The resin temperatures may be controlled by the cylinder setting temperature of the extruder or the rotation speed of the extruder.

In the present invention, the extruders preferably each have a vent hole for efficiently expelling water therefrom. Examples of the vent hole include an open vent adapted to remove water vapor and the like at a reduced pressure and an open vent adapted to remove water vapor at an ordinary pressure. Particularly, the vent hole is preferably kept at an ordinary pressure or at a slightly reduced pressure. In this case, the lower water content vinyl alcohol resin can be provided without coloration thereof even if the resin temperature in the extruder is higher, e.g., 180° C. or higher.

The vent hole is ideally kept at an ordinary pressure rather than at a reduced pressure, but the pressure in the vent hole may be slightly reduced if permitted. More specifically, the pressure is preferably 500 mmHg to 760 mmHg, particularly preferably 600 to 760 mmHg, further preferably 700 to 760 mmHg. If the pressure is too low, ambient air is liable to flow into the extruder from an opening of the extruder other than the vent hole. In this case, the vinyl alcohol resin is contaminated with oxygen to be deteriorated by oxidation, resulting in coloration. If the pressure in the vent hole is too high, the water cannot be efficiently released from the vinyl alcohol resin.

The deterioration of the resin due to the oxidation is suppressed by keeping the vent hole at an ordinary pressure or at a slightly reduced pressure. This is supposedly because a gas phase containing a great amount of water vapor is formed around the vent hole and a layer of the gas phase prevents oxygen-containing ambient fresh air from contacting the vinyl alcohol resin.

Where the vent hole is kept at a slightly reduced pressure, the pressure may be constant or may be intermittently changed.

The number of vent holes provided in each of the extruders is typically 1 to 6, preferably 2 to 5.

With the provision of an excessively small number of vent holes, it is often impossible to sufficiently expel the water from the resin, failing to provide the lower water content vinyl alcohol resin. With the provision of an excessively great number of vent holes, on the other hand, the resin is more liable to be brought into contact with air, resulting in coloration.

Any of the known types of vent holes such as port-type vent holes and long vent holes may be used, among which the long vent holes are particularly preferred.

In the present invention, dewatering slits, and other configurations and mechanisms having the same function as the vent holes may be used instead of the vent holes for expelling the water from the extruder. Preferred examples of the dewatering slits include dewatering slits of wedge wire type and dewatering slits of screen mesh type.

Where the extruders each have a plurality of vent holes, the vent holes may be of the same type or of different types to be used in combination.

It is also possible to add any of the aforementioned additives in the extruders. Where the additives are added into the extruders, an additive adding site is preferably located at a position at which the hydrous vinyl alcohol resin is in a molten state. The additives are preferably added into the extruders at one or two or more sites.

The forms of the additives are not, particularly limited, but the additives may be added in a powdery form, a paste form, or a dispersion form or a solution form with the additives dispersed or dissolved in a liquid. Particularly, the additives are preferably added in the solution form, because the solution form permits homogeneous and quantitative addition. A preferred example of the liquid is water which is easy to handle and safe.

The water content of the vinyl alcohol resin extruded from the final-stage extruder is typically not higher than 10 wt %, preferably not higher than 4 wt %, particularly preferably not higher than 3 wt %, further preferably not higher than 2 wt %. The water content of the resin can be controlled by the temperature and the retention time of the resin in the extruder.

A method of pelletizing the vinyl alcohol resin extruded from the final-stage extruder is not particularly limited, but an exemplary method is such that the vinyl alcohol resin is extruded into strands from a die, and then the strands are cooled and cut to a proper length. A method for the cooling is not particularly limited, but the cooling may be achieved by bringing the extruded vinyl alcohol resin into contact with a liquid kept at a temperature lower than the temperature of the resin or by applying cold air to the extruded resin. In the former case, water is preferably used as the liquid.

The pellets typically each have a cylindrical shape. Where the resin is later used as a molding/forming material, it is preferred for convenience that the die has an aperture diameter of 2 to 6 mmϕ and the strands are cut to a length of about 1 to about 6 mm. It is also preferred to cut the vinyl alcohol resin (e.g., EVOH) extruded from the extruder in a molten state in air or in water. In this case, pellets each having a spherical shape or pellets each having an irregular spherical shape are produced.

Depending on the water content of the resin pellets thus produced, the resin pellets may be dried to a proper water content by heating. A known drying apparatus adapted to dry resin pellets may be used.

EXAMPLES

The present invention will hereinafter be described by way of examples thereof. It should be understood that the present invention be not limited to the inventive examples without departing from the scope of the present invention.

In the following examples, "parts" and "%" are based on weight, unless otherwise specified.

Example 1

An EVOH methanol solution containing 100 parts by weight of an EVOH having an ethylene content of 29 mol % and a saponification degree of 99.6 mol % and 78 parts by weight of methanol was continuously fed to the second highest plate from a tower top of a 10-plate tower at a rate of 277 parts by weight/hr, and water vapor was continuously fed from the lowermost plate at a rate of 333 parts by weight/hr, whereby the EVOH methanol solution and the water vapor were brought into counter flow contact with each other in the plate tower. The internal temperature and the internal pressure of the tower were 126° C. and 0.26 MPaG, respectively. Methanol vapor and water vapor were distilled away from the tower top of the plate tower, then condensed in a condenser, and recovered in the form of a water/methanol mixture. An EVOH water/methanol mixture solution containing 100 parts by weight of the EVOH, 33 parts by weight of methanol and 103 parts by weight of water was continuously fed out from a tower bottom of the plate tower.

Then, the EVOH water/methanol mixture solution was fed at a rate of 236 parts by weight/hr into a container provided with an agitator of a paddle impeller type, and an aqueous solution containing 30 ppm of boric acid, 300 ppm of sodium acetate and 200 ppm of acetic acid based on 100 parts by weight of the EVOH was fed into the container at a rate of 1000 parts by weight/hr. Further, water vapor was fed into the container at a rate of 200 parts by weight/hr based on 100 parts by weight of the EVOH, and brought into contact with the EVOH water/methanol solution with stirring. The internal temperature and the internal pressure of the container were 110° C. and 0.20 MPaG, respectively. Four hours later, a viscoelastic hydrous EVOH (having a water content of 50%) was provided.

The resulting hydrous EVOH was continuously fed into a (former-stage) twin screw extruder, and kneaded. The specifications of the twin screw extruder were as follows:

L/D: 43.2
Aperture diameter: 59 mmϕ
Screws: Unidirectional complete mesh type
Rotation speed: 280 rpm

| Cylinder setting temperatures: | | |
|---|---|---|
| | C1 | 131° C. |
| | C2 | 129° C. |
| | C3 | 130° C. |
| | C4 | 116° C. |
| | C5 | 130° C. |
| | C6 | 134° C. |
| | C7 | 150° C. |
| | C8 | 125° C. |
| | C9 | 144° C. |
| | C10 | 151° C. |
| | C11 | 150° C. |
| | C12 | 149° C. |
| | C13 | 169° C. |
| | C14 | 120° C. |
| | H | 174° C. |

Die setting temperature: 176° C.
Die aperture diameter: 4.0 mmϕ
Vent positions: C5, C8, C10 and C13
Vent shape: Long vent
Vent pressure: Ordinary pressure (760 mmHg)

The resin temperature during the kneading in the extruder was 101° C., and the hydrous EVOH extruded from the extruder had a water content of 34.4 wt %. The retention time of the hydrous EVOH in the extruder was 0.3 minutes. The power of the extruder at this time was 10.0 kW.

Then, the resulting resin was fed into another twin screw extruder (final-stage twin screw extruder); and kneaded. A 5-cm diameter transport pipe was provided between the (former-stage) twin screw extruder and the (final-stage) twin screw extruder. The specifications of the (final-stage) twin screw extruder were as follows:

L/D: 43.2
Aperture diameter: 59 mmφ
Screws: Unidirectional complete mesh type
Rotation speed: 450 rpm
Cylinder setting temperatures:
C1 152° C.
C2 150° C.
C3 150 C.
C4 141° C.
C5 150° C.
C6 171° C.
C7 170° C.
C8 130° C.
C9 170° C.
C10 171° C.
C11 170° C.
C12 161° C.
C13 183° C.
C14 167° C.
H 189° C.
Die setting temperature: 181° C.
Die aperture diameter: 6.0 mmφ
Vent positions: C5, C8, C10 and C13
Vent shape: Long vent
Vent pressure: Ordinary pressure (760 mmHg)

The resin temperature during the kneading in the extruder was 227° C. The extrusion rate for extrusion of the resulting EVOH from the extruder was 470 kg/hr. The water content of the EVOH was 1.0 wt %. The retention time of the hydrous EVOH in the extruder was 0.2 minutes. The power of the extruder at this time was 34.0 kW. The resulting EVOH had a melt flow rate (MFR) of 3 g/10 minutes (at 210° C. with a load of 2160 g).

Example 2

An EVOH was produced in substantially the same manner as in Example 1, except that the rotation speed of the final-stage twin screw extruder was 400 rpm.

At this time, the resin temperature during the kneading in the final-stage extruder was 221° C., and the extrusion rate for the extrusion of the resulting EVOH from the extruder was 340 kg/hr. The water content of the EVOH was 0.8 wt %. The retention time of the hydrous EVOH in the extruder was 0.3 minutes. The power of the extruder at this time was 29.0 kW. The resulting EVOH had a melt flow rate (MFR) of 3 g/10 minutes (at 210° C. with a load of 2160 g).

Example 3

An EVOH was produced in substantially the same manner as in Example 1, except that the rotation speed of the final-stage twin screw extruder was 300 rpm.

At this time, the resin temperature during the kneading in the final-stage extruder was 237° C. The extrusion rate for the extrusion of the resulting EVOH from the extruder was 210 kg/hr. The water content of the EVOH was 0.6 wt %. The retention time of the hydrous EVOH in the extruder was 0.4 minutes. The power of the extruder at this time was 21.0 kW. The resulting EVOH had a melt flow rate (MFR) of 3 g/10 minutes (at 210° C. with a load of 2160 g).

Example 4

An EVOH was produced in substantially the same manner as in Example 1, except that the following former-stage and final-stage twin screw extruders were used.

The EVOH was continuously fed into the (former-stage) twin screw extruder, and kneaded. The specifications of the twin screw extruder were as follows:

L/D: 54.0
Aperture diameter: 59 mmφ
Screws: Unidirectional complete mesh type
Rotation speed: 880 rpm
Cylinder setting temperatures:
C1 130° C.
C2 130° C.
C3 130° C.
C4 130° C.
C5 130° C.
C6 130° C.
C7 150° C.
C8 150° C.
C9 150° C.
C10 150° C.
C11 150° C.
C12 150° C.
C13 150° C.
C14 180° C.
H 180° C.
Die setting temperature: 180° C.
Vent positions: C4, C7, C10 and C13
Vent shape: Long vent
Vent pressure: Ordinary pressure (760 mmHg)

The resin temperature during the kneading in the extruder was 108° C., and the hydrous EVOH extruded from the extruder had a water content of 38.7 wt %. The retention time of the hydrous EVOH in the extruder was 0.3 minutes. The power of the extruder at this time was 27.4 kW.

Then, the resulting resin was fed into another twin screw extruder (final-stage twin screw extruder), and kneaded. A 5-cm diameter transport pipe was provided between the (former-stage) twin screw extruder and the (final-stage) twin screw extruder. The specifications of the (final-stage) twin screw extruder were as follows:

L/D: 46.8
Aperture diameter: 59 mmφ
Screws: Unidirectional complete mesh type
Rotation speed: 500 rpm
Cylinder setting temperatures:
C1 130° C.
C2 130° C.
C3 130° C.
C4 130° C.
C5 130° C.
C6 130° C.
C7 130° C.
C8 170° C.
C9 170° C.
C10 170° C.
C11 170° C.
C12 171° C.
C13 170° C.
C14 170° C.
C15 180° C.
C16 180° C.
H 180° C.
Die setting temperature: 180° C.
Die aperture diameter: 6.0 mmφ
Vent positions: C5, C8, C11 and C14
Vent shape: Long vent
Vent pressure: Ordinary pressure (760 mmHg)

The resin temperature during the kneading in the extruder was 213° C. The extrusion rate for the extrusion of the resulting EVOH from the extruder was 340 kg/hr. The water content of the EVOH was 3.1 wt %. The retention time of the hydrous EVOH in the extruder was 0.2 minutes. The power of the extruder at this time was 103.6 kW. The resulting EVOH had a melt flow rate (MFR) of 3 g/10 minutes (at 210° C. with a load of 2160 g).

Example 5

A modified EVOH methanol solution containing 100 parts by weight of a modified EVOH containing 1.5 mol % of a 1,2-diol structural unit at its side chain and having an ethylene content of 38 mol % and a saponification degree of 99.6 mol % and 81 parts by weight of methanol was continuously fed to the second highest plate from a tower top of a 10-plate tower at a rate of 143 parts by weight/hr, and water vapor was continuously fed from the lowermost plate at a rate of 60 parts by weight/hr, whereby the modified EVOH methanol solution and the water vapor were brought into counter flow contact with each other in the plate tower. The internal temperature and the internal pressure of the tower were 105° C. and 0.15 MPaG, respectively. Methanol vapor and water vapor were distilled away from the tower top of the plate tower, then condensed in a condenser, and recovered in the form of a water/methanol mixture. A modified EVOH water/methanol mixture solution containing 100 parts by weight of the modified EVOH, 124 parts by weight of methanol and 53 parts by weight of water was continuously fed out from a tower bottom of the plate tower.

Then, the modified EVOH water/methanol mixture solution was continuously fed at a rate of 515 parts by weight/hr into a container provided with an agitator of a paddle impeller type, and an aqueous solution containing 123 ppm of boric acid, 280 ppm of sodium acetate and 206 ppm of acetic acid based on 100 parts by weight of the modified EVOH was fed into the container at a rate of 1030 parts by weight/hr. Further, water vapor was fed into the container at a rate of 200 parts by weight/hr based on 100 parts by weight of the modified EVOH, and brought into contact with the EVOH water/methanol solution with stirring: The internal temperature and the internal pressure of the container were 110° C. and 0.20 MPaG, respectively. Four hours later, a viscoelastic hydrous EVOH (having a water content of 45%) was provided.

The resulting hydrous EVOH was continuously fed into a (former-stage) twin screw extruder, and kneaded. The specifications of the twin screw extruder were as follows:

L/D: 46.8
Aperture diameter: 59 mmφ
Screws: Unidirectional complete mesh type
Rotation speed: 800 rpm
Cylinder setting temperatures:

| | | |
|---|---|---|
| | C1 | 100° C. |
| | C2 | 100° C. |
| | C3 | 100° C. |
| | C4 | 100° C. |
| | C5 | 100° C. |
| | C6 | 100° C. |
| | C7 | 100° C. |
| | C8 | 100° C. |
| | C9 | 100° C. |
| | C10 | 100° C. |
| | C11 | 100° C. |
| | C12 | 100° C. |
| | C13 | 100° C. |
| | C14 | 100° C. |
| | H | 100° C. |

Die setting temperature: 100° C.
Vent positions: C4, C7, C10 and C13
Vent shape: Long vent
Vent pressure: Ordinary pressure (760 mmHg)

The resin temperature during the kneading in the extruder was 106° C., and the hydrous EVOH extruded from the extruder had a water content of 33.8 wt %. The retention time of the hydrous EVOH in the extruder was 0.3 minutes. The power of the extruder at this time was 70.6 kW.

Then, the resulting resin was fed into another twin screw extruder (final-stage twin screw extruder), and kneaded. A 5-cm diameter transport pipe was provided between the (former-stage) twin screw extruder and the (final-stage) twin screw extruder. The specifications of the (final-stage) twin screw extruder were as follows:

L/D: 46.8
Aperture diameter: 59 mmφ
Screws: Unidirectional complete mesh type
Rotation speed: 420 rpm
Cylinder setting temperatures:

| | | |
|---|---|---|
| | C1 | 150° C. |
| | C2 | 150° C. |
| | C3 | 150 C. |
| | C4 | 150° C. |
| | C5 | 150° C. |
| | C6 | 150° C. |
| | C7 | 170° C. |
| | C8 | 170° C. |
| | C9 | 170° C. |
| | C10 | 170° C. |
| | C11 | 170° C. |
| | C12 | 170° C. |
| | C13 | 170° C. |
| | C14 | 170° C. |
| | H | 180° C. |

Die setting temperature: 180° C.
Die aperture diameter: 3.6 mmφ
Vent positions: C6, C8, C10 and C13
Vent shape: Long vent
Vent pressure: Ordinary pressure (760 mmHg)

The resin temperature during the kneading in the extruder was 210° C., and the extrusion rate for extrusion of the resulting EVOH from the extruder was 333 kg/hr. The water content of the EVOH was 1.2 wt %. The retention time of the hydrous EVOH in the extruder was 0.2 minutes. The power of the extruder at this time was 96.6 kW. The resulting EVOH had a melt flow rate (MFR) of 3 g/10 minutes (at 210° C. with a load of 2160 g).

Comparative Example 1

An EVOH was produced in substantially the same manner as in Example 1, except that the rotation speed of the former-stage twin screw extruder was 800 rpm and the final-stage twin screw extruder was not used.

At this time, the resin temperature during the kneading in the former-stage extruder was 203° C. The extrusion rate for the extrusion of the resulting EVOH from the extruder was 176 kg/hr. The water content of the EVOH was 3.6 wt %. The retention time of the hydrous EVOH in the extruder was 0.5 minutes. The resulting EVOH had a melt flow rate (MFR) of 3 g/10 minutes (at 210° C. with a load of 2160 g).

The results of these examples are shown in Table 1.

TABLE 1

|  | Example 1 | Example 2 | Example 3 | Example 4 | Example 5 | Comparative Example 1 |
|---|---|---|---|---|---|---|
| Water content (wt %) of resin obtained at former stage | 34.4 | 34.4 | 34.4 | 38.7 | 33.8 | — |
| Retention time ratio (former stage/final stage) | 3/2 | 1/1 | 3/4 | 3/2 | 3/2 | — |
| Power ratio (former stage/final stage) | 3.4 | 2.9 | 2.1 | 3.8 | 1.4 | — |
| Water content (wt %) of resin finally obtained | 1.0 | 0.8 | 0.6 | 3.1 | 1.2 | 3.6 |
| Extrusion rate (kg/hr) | 470 | 340 | 210 | 340 | 333 | 176 |

Where the hydrous vinyl alcohol resin was dewatered through a multistage process employing the plurality of extruders (in Examples 1 to 5), the resin extrusion rate was higher, and the water content of the resin was sufficiently reduced. Particularly, in Example 1, the vinyl alcohol resin having a water content of not higher than 10 wt % was produced at the highest processing efficiency.

Where the single extruder was used (in Comparative Example 1), the water content was not sufficiently reduced even with the resin temperature increased by shear heat generated by increasing the rotation speed, and the extrusion rate was lower.

Although specific forms of embodiments of the instant invention have been described above in order to be more clearly understood, the above description is made by way of example and not as a limitation to the scope of the instant invention. It is contemplated that various modifications apparent to one of ordinary skill in the art could be made without departing from the scope of the invention.

The inventive vinyl alcohol resin production method permits efficient dewatering of the highly hydrous vinyl alcohol resin to ensure easy production of the lower water content vinyl alcohol resin, thereby reducing the production costs. Therefore, the inventive method is useful in industry.

The invention claimed is:

1. A vinyl alcohol resin production method comprising the step of kneading and dewatering a hydrous vinyl alcohol resin in an extruder, wherein the kneading and dewatering step includes the step of performing a multistage dewatering process for dewatering the hydrous vinyl alcohol resin having a water content of higher than 40 wt. % and not higher than 100 wt. % in plural extruders to provide a vinyl alcohol resin having a water content of not higher than 4 wt. %;

wherein the kneading and dewatering step includes the step of dewatering the hydrous vinyl alcohol resin to a water content level of not higher than 4 wt. % in a final one of the kneading areas of the extruders after reducing the water content of the hydrous vinyl alcohol resin from a water content level of higher than 40 wt. % and not higher than 100 wt. % to a water content level of 20 to 40 wt. % in the kneading areas other than the final one of the kneading areas of the extruders.

2. A vinyl alcohol resin production method as set forth in claim 1, wherein a ratio of total weight of water removed in the other kneading areas to weight of water removed in the final kneading area is 50/50 to 5/95 when the multistage dewatering process is performed for dewatering the hydrous vinyl alcohol resin in the plural extruders.

3. A vinyl alcohol resin production method as set forth in claim 1, wherein a ratio ((a)/(b)) of a power (a) of the final extruder to the highest one (b) of powers of the other extruders is not less than 1.

4. A vinyl alcohol resin production method as set forth in claim 3, wherein a ratio of total weight of water removed in the other extruders to weight of water removed in the final extruder is 50/50 to 5/95 when the hydrous vinyl alcohol resin is kneaded and dewatered in the plurality of extruders.

5. A vinyl alcohol resin production method as set forth in claim 4, wherein the vinyl alcohol resin has a melting point of 120° C. to 200° C.

6. A vinyl alcohol resin production method as set forth in claim 4, wherein the vinyl alcohol resin is an ethylene-vinyl alcohol copolymer.

7. A vinyl alcohol resin production method as set forth in claim 1, wherein the vinyl alcohol resin has a melting point of 120° C. to 200° C.

8. A vinyl alcohol resin production method as set forth in claim 1, wherein the vinyl alcohol resin is an ethylene-vinyl alcohol copolymer.

* * * * *